United States Patent [19]

Barth

[11] 4,128,250
[45] Dec. 5, 1978

[54] PISTONS AND PISTON RINGS
[75] Inventor: Hermann Barth, Stuttgart, Germany
[73] Assignee: Mahle GmbH, Stuttgart, Germany
[21] Appl. No.: 770,498
[22] Filed: Feb. 22, 1977

Related U.S. Application Data
[63] Continuation of Ser. No. 640,866, Dec. 15, 1975, abandoned.

[30] Foreign Application Priority Data
Dec. 21, 1974 [DE] Fed. Rep. of Germany ....... 2460883

[51] Int. Cl.² .............................................. F16J 9/00
[52] U.S. Cl. ................................................ 277/189.5
[58] Field of Search ............. 277/189.5, 206 R, 237 R

[56] References Cited
U.S. PATENT DOCUMENTS
1,426,913   8/1922   Sackman ........................ 277/189.5

*Primary Examiner*—Robert I. Smith
*Attorney, Agent, or Firm*—William Anthony Drucker

[57] ABSTRACT

An annular reinforcement for piston ring grooves, the reinforcement being provided with inclined bores so that when the reinforcement is built into the piston and the bores are filled with material integral with the piston, movement of the reinforcement both in the axial and radial directions is resisted.

1 Claim, 2 Drawing Figures

PISTONS AND PISTON RINGS

This is a continuation of Ser. No. 640,866, filed Dec. 15, 1975, now abandoned.

BACKGROUND OF THE INVENTION

1. Field of the Invention

This invention relates to a single-part annular reinforcement (annular support) for piston ring grooves of light-metal pistons, with cylindrical borings which are provided inside the annular support and which, when the support is built into the piston, are filled with piston material.

The main problem arising in the use of annular supports for the reinforcement of piston ring grooves is that of firmly securing them inside the material of the piston.

2. Description of the Prior Art

Methods of securing the annular support in the piston material are fundamentally subdivided into chemical and mechanical connections and a combination of the two. To obtain a satisfactory mechanical connection, a number of different external shapes for the annular support are already known. For a firm mechanical connection it is important that the external shape of the annnular support should be such that the piston material immediately adjacent thereto should be able to engage apertures of the undercut type. An external shape of this kind for the annular support is obtained, for example, with a fissured cast skin with numerous irregularly undercut cavities in accordance with German Pat. No. 1,224,104. The same purpose is fulfilled bu dovetailed securing devices on the outer surfaces of an annular support, such as shown in Austrian Pat. No. 247,072. In brief, the securing system must be such that the annular support engages undercuts in the piston material with a claw-type engagement in all directions.

This claw-type engagement is absent from the known annular supports with borings serving to accommodate piston material. An example is provided by the annular support system covered by German Pat. No. 1,165,934. For in this system the borings are parallel to the longitudinal axis of the piston and therefore not capable of securing the annular support against displacements in the said direction. Similar considerations apply to the conical borings provided in an annular support in accordance with German Pat. No. 1,038,833 and running parallel to the longitudinal axis of the piston. Apart from the fact that this is in any case merely a sheet metal insert for a flank of a piston ring groove, conical borings paraxial to the axis of the piston will likewise only constitute a form-closed securing device for the annular support to one side in the said direction, i.e., towards the side having the smaller boring diameter. In the opposite direction, i.e., towards the side with the greater boring diameter, the said supporting action is naturally absent. Yet it is precisely in this latter direction that a mechanical supporting action such as obtained by undercuts in the dovetailed system is particularly important. The individual flanks of a single-part annular support thus cannnot be given a mechanical claw-like engagement in the piston material by providing conical borings, in which for reasons connected with the technique of manufacture the greater boring diameter must naturally always be situated on the outer surface of the annular support. This is doubtless also one of the reasons why the reinforcement inserts provided by German Pat. No. 1,038,833 for the annular grooves are characterized not only by borings but also by securing devices of the dovetail type.

One of the results of the difficulties experienced in producing recesses such as conical borings which would act like undercuts and be simple to work into the material was that in the case of the annular support suggested in U.S. Pat. No. 2,996,341 two separate elements were required for the reinforcement of the upper surface and the lower surface of the groove. It is only in the base of the groove that these elements rest loosely against each other. In practice, therefore, this system fails to provide a means of preventing displacement in all directions. For here, just as in the case of the conical borings of the annular support covered by German Pat. No. 1,038,833, the reinforcements of the flanks of the groove are not secured in the axial direction.

SUMMARY OF THE INVENTION

The object of the invention is to enable the ring support to be evenly and reliably secured in the piston material in all directions by a claw-like action, simply by using the cylindrical borings passing through the annular support. In this system particular importance is attached to ensuring that the recesses providing the claw-like action will be simple to produce.

This object is mainly achieved by the fact that the axes of the cylindrical borings passing through the annular support are inclined both in relation to the longitudinal axis of the piston and in relation to the plane vertical to the said longitudinal axis, or also by the fact that the axes of the said borings are situated in a plane perpendicular to the longitudinal axis of the piston and do not intersect this latter axis itself.

When the borings are inclined in this way the piston material introduced into them, being supported on the form-closed principle, prevents any displacement of the annular support, both in the axial and in the radial direction of the piston. Put simply, the object of the inclined position selected for the borings, where the securing action is concerned, is the same as when the nails are driven in obliquely when a cover is nailed onto a wooden case, i.e., to ensure that the cover cannot be lifted up so easily as if the nails had been driven in straight.

The borings made in the annular support preferably slant at different angles. Adjacent borings, for example, can be inclined "X-wise" in relation to each other. The borings in the material of the annular support are usually made in the solid (i.e., made in the annular support before it has been provided with an annular groove); in the case of cast annular supports, of course, they may be already included at the casting stage.

The annular support constructed in accordance with the invention, by comparison with the annular supports already known, with apertures of the undercut type on the outer surfaces, offers the great advantage of being simple to produce. The ring can be provided with all the borings in one single operation by simply adjusting the drills at different angles. The required undercuts can thus be obtained in an extremely simple manner.

DESCRIPTION OF THE PREFERRED EMMBODIMENT

Figure 1:
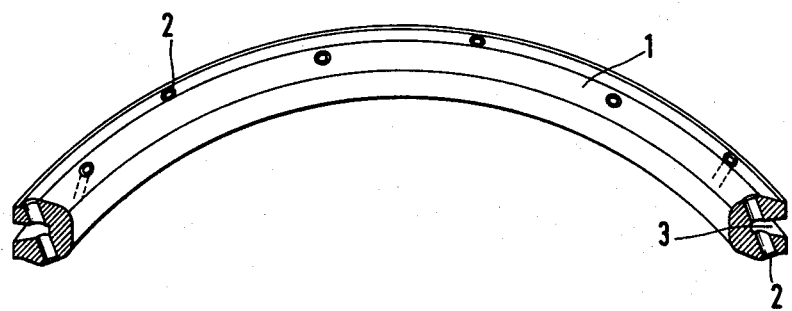
FIG. 1 shows a perspective view of part of an annular support.
Figure 2:
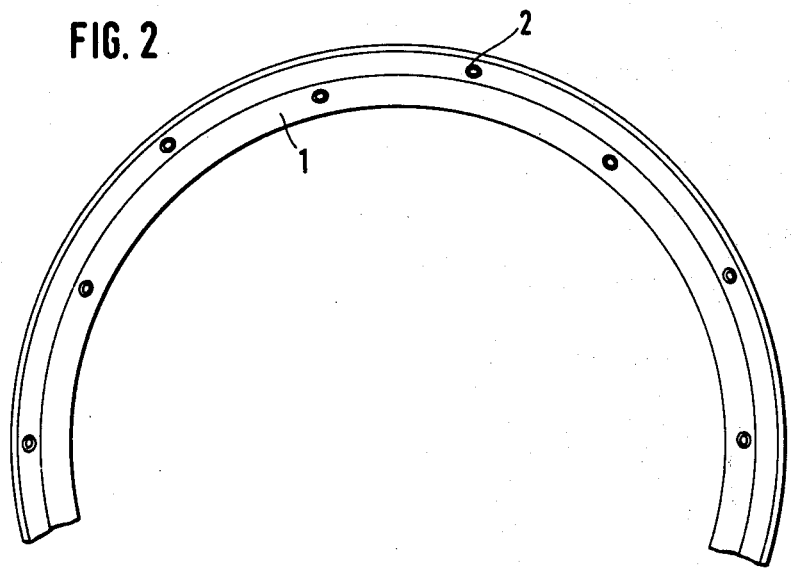
FIG. 2 shows a plan view of an annular support.

Borings 2, inclined approximately "X-wise" in relation to each other, pass through the annular support 1, of which only a segment is shown. In the case of an annular support worked into a light metal piston these borings 2 are filled with the light metal of a piston. This piston material, passing through the borings of the annular support, practically secures the said annular support inside the piston. The filling of the borings 2 is generally effected by pressing in the light metal material of the piston, the entire material of the piston being subjected to pressure when the piston is being shaped (e.g in the case of forged pistons). It is also possible, however, for the piston material to be cast into the borings 2 (e.g. in the case of cast pistons). The groove to be cut in the annular support and serving to accommodate the piston ring is marked 3 in the drawing.

I claim:

1. A one-piece annular reinforcement insert for a piston ring groove for a light metal piston, said insert having only a single annular groove formed radially inwards from the outermost periphery of the insert to form opposite flanks, and having cylindrical borings extending within the insert and which are filled with the piston material integral with the piston so as to form pins in the borings, said borings having its ends in the upper and lower annular surfaces of the insert and being disposed on axes inclined in relation to the longitudinal axis of the insert, wherein said borings extend entirely through the two flanks and communicate with the annular groove so as to provide two holes for two pins in each bore one in each of said flanks, said two holes being separated from each other by the annular groove.

* * * * *